Sept. 29, 1959 R. W. HANFORD 2,906,830

DIRECT CURRENT AMPLIFIER

Filed Jan. 17, 1955

RICHARD W. HANFORD

INVENTOR

BY Richard G. Stephens

ATTORNEY

United States Patent Office 2,906,830

Patented Sept. 29, 1959

2,906,830

DIRECT CURRENT AMPLIFIER

Richard W. Hanford, Lisle, N.Y., assignor to Link Aviation, Inc., Binghamton, N.Y., a corporation of New York Application January 17, 1955, Serial No. 482,148

11 Claims. (Cl. 179—171)

My invention relates to improved direct current amplifiers of the type utilized in computer, automatic control and instrumentation circuits. The operation of such amplifiers is to receive a direct input current or voltage and to produce accurately an output potential which is a function of the input quantity. It is desirable that such amplifiers have low or high input impedance for current or voltage applications respectively, low output impedance, minimum drift, good frequency response, and sensitivity substantially independent of the magnitude of the input quantity. The use of such amplifiers as summing amplifiers, buffer amplifiers, integrating amplifiers and other operational amplifiers is very extensive, so that it becomes extremely desirable to produce operational amplifiers of maximum simplicity at minimum cost. Various techniques are known which individually effect the aforementioned desiderata, but the provision of a simple and inexpensive operational amplifier having all of the abovesaid features is believed heretofore to be unknown.

It is therefore a primary object of my invention to provide a simple and inexpensive operational amplifier.

It is another object of the invention to provide an improved operational current amplifier having freedom from drift.

It is a further object of the invention to provide an operational amplifier of the type described which is self-balancing, and in which sensitivity is independent of applied signal level.

It is another object of the invention to provide an improved operational amplifier of the type described having a frequency response which is rapid enough for most computer, automatic control and instrumentation applications.

It is an additional object of the invention to provide an operational voltage amplifier having an extremely low output impedance and high input impedance.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawing, in which.

In each of the figures like numerals refer to like parts and component values given are exemplary only.

Figures 1, 2, 3, 4:
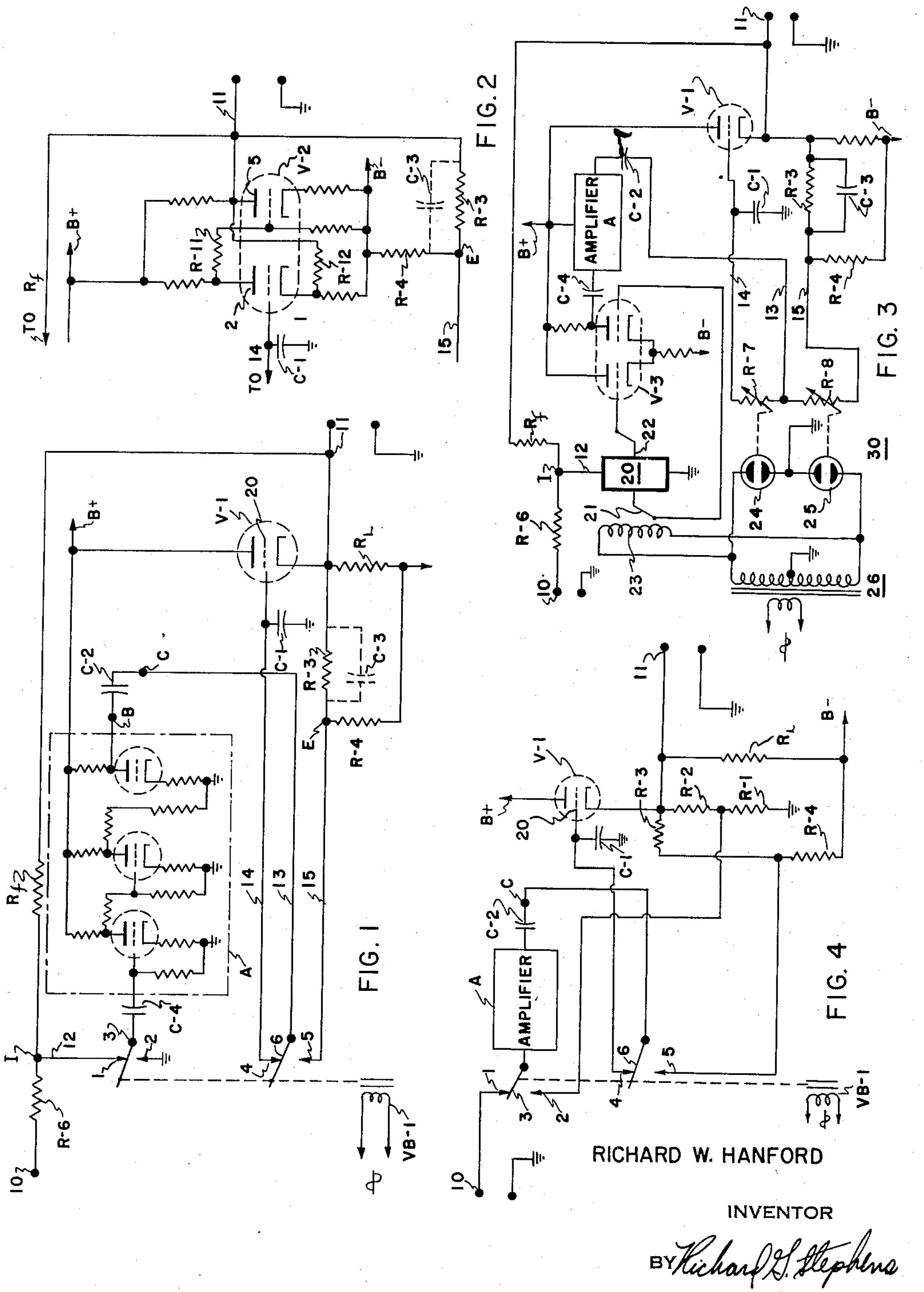
Fig. 1 illustrates in electrical schematic form a preferred embodiment of the invention.
Fig. 2 illustrates an alternative isolating circuit of my invention.
Fig. 3 illustrates an alternative embodiment of the invention in which electronic gating means are substituted for electromechanical switching means used in Fig. 1.
Fig. 4 illustrates schematically an alternative embodiment of the invention used as a voltage amplifier.

Referring now to Fig. 1 there is shown schematically a preferred embodiment of the invention as it may be utilized for the amplification of direct currents such as, for example, those applied to analogue computer summing amplifiers, those produced by ionization chambers, and similar currents utilized in computer, automatic control, and instrumentation apparatus. The invention serves to receive the applied input current and to produce an output potential as a specified function of such current. The input current to be measured is applied to terminal 10. It may be seen that if all of the input current were to flow through impedance $R_f$ to output terminal 11, that terminal I would lie at a virtual ground potential when the potential at terminal 11 would be equal to the product of input current and the resistance of impedance $R_f$. If a scaling resistor such as R–6 is inserted between terminal 10 and terminal I, the invention functions as a voltage amplifier. The invention derives a potential at terminal 11 which maintains terminal I at ground potential, thusly providing an output potential which is proportional to the input current or voltage.

Terminal I is connected to contact 1 of a double-pole double-throw, switching or gating means shown as comprising an electromechanical vibrator or "chopper," which rapidly translates its selector contact 3 between its contacts 1 and 2, the latter contact being grounded. If conductor 12 remains at ground potential, the potential on contact 3 will not change as contact 3 is switched back and forth between contacts 1 and 2. If the input current applied to terminal 10 changes so that a potential other than the ground reference potential appears at terminal I and contact 1, it will be seen that a square wave "error" voltage will be derived on contact 3. The error voltage is applied via capacitor C–4 to the input circuit of a conventional voltage amplifier such as that indicated within dashed lines as A in Fig. 1. If extremely small currents such as ionization currents are to be measured, the input stage of amplifier A should be an electrometer tube, otherwise any conventional amplifier may be utilized. Amplifier A may be A.C. or D.C. coupled, and the fact that high gain may be effected economically by provision of A.C. coupled amplifying means is an important feature of my invention. Amplifier A should have substantially 180 degrees phase shift or polarity reversal, high gain and fairly good frequency response. Neither gain nor frequency response are critical, however, and changes in gain affect only the response time of the invention. The error voltage on contact 3 of chopper VB–1 is appreciably amplified by amplifying means A, providing an amplified square wave voltage output to capacitor C–2. The frequency response of amplifier A need not be made inordinately high to avoid distorting the square wave, nor need the amplification be linear.

Assume that terminal I has gone slightly positive. It will be seen that during time $t_1$ (the half-cycle when contact 3 is connected to contact 1) that an amplified negative voltage will be applied to coupling capacitor C–2, and that during time $t_2$ (the half-cycle when contact 3 is connected to grounded contact 2) that a positive-going potential will be applied to capacitor C–2. Terminal C of capacitor C–2 is connected to contact 6 of the chopper switching means VB–1, which alternately connects contact 6 to contact 4 (during time $t_1$) and contact 5 (during time $t_2$). The amplified negative voltage applied to capacitor C–2 during time $t_1$ is applied via contact 4 to charge capacitor C–1 negatively and to drive the grid 20 of cathode follower V–1 negatively, decreasing cathode current through V–1, thereby making output terminal 11 go negative. Assume that the circuit elements of cathode follower V–1 have been selected so that terminal 11 lies at ground potential with no signal input to grid 20. The negative swing of terminal 11 derived because of the assumed positive error potential at terminal I will apply a potential to re-balancing or feedback impedance $R_f$ tending to minimize the error potential at terminal I. If the gain of the amplifier A is low, and if the input current change is considerable, it will be seen that the invention may not re-balance during the first $t_1$ half-cycle, but may require several $t_1$ half-cycles to re-balance, and if a continuously varying signal input is applied to terminal 10 that the circuit might closely approach a balanced condition during each $t_1$ half-cycle but never become fully rebalanced. Since an isolating or "buffer" means (shown in Fig. 1 as comprising a cathode follower) is provided between the top terminal (conductor 14) and contact 5, appreciable current may flow through conductor 15 and contact 5 during $t_2$ half-cycles without affecting the level of the potential across storage capacitor C–1, since cathode follower V–1 has a high input impedance and a low output impedance.

Continuing the above example, assume that the chopper VB–1 now transfers its contacts to begin a $t_2$ half-cycle. Since grid 20 of the cathode follower V–1 is permanently connected to storage capacitor C–1, the output potential at terminal 11 will remain at the same "almost balanced" potential it had assumed at the end of the $t_1$ half-cycle (assuming negligible leakage in capacitor C–1 and negligible grid current). As contact 6 of chopper VB–1 engages contact 5, the positive-going potential output from amplifier A is applied via capacitor C–2, conductor 13 and conductor 15 to terminal E. Resistors R–3, R–4 and $R_L$ are low impedances, so that the terminal C side of capacitor C–2 is quickly discharged to the potential existing on terminal E. As will be further explained below, terminal E is automatically maintained at a potential substantially equal to the potential then existing on storage capacity C–1 and grid 20. Connection of C–2 to terminal E during $t_2$ half-cycles thusly serves to "prepare" the terminal C side of capacitor C–2 with that potential, which will be very near the potential on capacitor C–1 at the initiation of the next succeeding $t_1$ half-cycle for the circuit to completely balance. If the invention becomes completely rebalanced during the first $t_1$ half-cycle, the potential at terminal E will suitably "prepare" capacitor C–2 so that when capacitor C–2 is subsequently re-connected to storage capacitor C–1 and grid 20 during the next $t_1$ half-cycle, capacitor C–2 will have substantially the same potential as C–1, and there being no error voltage output from amplifier A, there will be no flow of current through C–2 and C–1 to unbalance the circuit. Thus it will be seen that contact 6 of the chopper switching means serves to apply correcting impulses to capacitor C–1 each $t_1$ half-cycle until the circuit becomes completely balanced, and also "prepares" capacitor C–2 during each $t_2$ half-cycle with a potential equal to that on C–1 and which will be changed if an error signal still exists during the succeeding $t_1$ half-cycle, or which will remain the same if no amplified error signal is applied from amplifier A. Since the terminal C side of capacitor C–2 is prepared with the same potential as capacitor C–1 it will be seen that only a very small error signal will be required to be applied to storage capacitor C–1 to accomplish balance. Since terminal C of capacitor C–2 is always conditioned or forced to the potential of C–1 while the amplifier input is connected through C–4 and VB–1 to ground, it will be seen that the sensitivity of the invention does not change with the magnitude of the applied signal.

The above described circuit operation was predicted on the assumption that terminal E remained at the same potential as grid 20 regardless of input signal level. In order to provide such operation either resistance R–3 or R–4 may comprise a resistor having a non-linearity substantially to compensate for the non-linearity of cathode follower V–1. In order to maintain the impedance of the cathode circuit of V–1 at a low value, so that terminal C may readily assume the potential at terminal E during $t_2$ half-cycles, resistor R–3 may be by-passed by a capacitor (shown in dashed lines as C–3 in Fig. 1), such a by-pass capacitor preferably having at least ten times as much capacity as capacitor C–2. It should be noted that the circuit of Fig. 1 is entirely adequate for many applications without the provision of resistances R–3 and R–4. Assuming that R–3 is shorted and R–4 is omitted, or are linear and V–1 is non-linear the only possibly harmful effect is the occurrence of a small sawtooth or spike potential of short duration superimposed on the output potential. The sawtooth will have a repetition rate corresponding to chopper frequency, and in many applications may be filtered out with a simple low pass filter.

Another salient feature of my invention is its inherent freedom from drift. Since the error signal applied to amplifier A is derived with respect to grounded contact 2, any "drift" above or below grounded potential at terminal I is automatically cancelled by the balancing operation described above. Since isolating device V–1 is responsive only to the potential level of capacitor C–1 and disconnected from amplifier A during $t_2$ half-cycles, no further correction toward a completely balanced condition is made during $t_2$ half-cycles, and hence the overall frequency response of the invention is limited by the frequency of switching means VB–1. A large majority of the operational amplifiers used in analogue computer, automatic control and instrumentation apparatus do not require a more rapid frequency response than may be obtained with the invention. A chopper frequency of approximately three kilocycles has been found to be quite suitable for almost all applications, although wide use of the invention has been made driving the chopper at the power line frequency of sixty cycles per second. The chopper may include a simple electromagnet actuated by an alternating current as shown schematically in Fig. 1, or it may be provided with a self-interrupting contact (not shown) in the magnet coil circuit so that direct current may be utilized to actuate the chopper. An extremely fast gating means which may be substituted for the chopper gating means will be explained below in connection with Fig. 3. Contact 3 of chopper VB–1 is preferably a "make before break" type contact so that the input terminal of amplifier A is never left floating, while contact 6 is a "break before make" type contact, so that storage capacitor C–1 will be entirely disconnected from conductor 13 before conductor 13 is connected to terminal E, avoiding discharge of storage capacitor C–1. After the circuit becomes balanced, the charge on capacitor C–1 maintains the output potential at the correct level and no error signal is necessary to maintain balance as in conventional prior art direct current amplifiers. Hence the "dead band," or amount which the input circuit of the invention may stray from ground potential prior to the occurrence of re-balancing action, is extremely small. Since no error signal is required to maintain the invention at a steady balance, the input impedance of the invention is practically zero. The low output impedance of the cathode follower provides means by which substantial output currents may be supplied by the invention.

The invention may also be used as an integrator by providing a capacitor in place of resistance $R_f$, as will be apparent to those skilled in the art. Since the difference between feedback amplifier and integrator operation are well known, no detailed description of circuit operation will be given herein. In utilizing the invention as an integrator, a high resistance (approximately 1 megohm in the circuit of Fig. 1) should be inserted between contact 2 and ground in order that make-before-break contact 3 will not discharge the integrating capacitor to ground when transferring from contact 1 to contact 2.

Shown in Fig. 2 is one alternative isolating means which, for example, may be used in place of cathode follower V–1 of Fig. 1. The device comprises a dual-triode amplifier V–2. The potential level of storage capacitor C–1 is applied to the grid of the left-hand section of V–2, determining the potential on plate 2 of V–2. The voltage on plate 2 is applied through resistor R–11 to the grid of the right-hand section of V–2. The output potential from plate 5 of V–2 is applied to output terminal 11, to feedback impedance $R_f$ to diminish the error signal, and to cathode 1 of dual triode V–2 via resistor R–12. The degenerative feedback through resistor R–12 serves to linearize the operation of the isolation device in a manner which will be apparent to those skilled in the art. A potential at terminal E which substantially matches that across capacitor C–1 is derived in the same manner as in Fig. 1 and applied via conductor 15 during $t_2$ half-cycles to prepare coupling capacitor C–2. Another form of isolating means which has been used is a pair of cascaded cathode followers. Other isolating means will become apparent to those skilled in the art.

Like those isolating circuits shown, any isolating means utilized should have high input impedance, low output impedance, and a terminal associated with its output circuit to provide a potential of substantially the same magnitude as the input potential applied to the isolating means.

Shown in Fig. 3 is an alternative embodiment of the invention in which electronic gating has been utilized to replace the vibrator or chopper utilized in Fig. 1. Assume that an input voltage is applied at terminal 10 through resistance R–6 to a semi-conductor 20, which may comprise for example, a piece of germanium. Electrodes 21 and 22 may be adjusted to equipotential points. Semi-conductor 20 is disposed within the magnetic field of coil 23, and it will be understood by those skilled in the art that if an alternating current is applied to coil 23, alternating voltages varying in magnitude in accordance with the direct current through the semi-conductor and having a frequency determined by the frequency of the applied magnetic field will appear on electrodes 21 and 22 as a result of Hall effect. The currents from electrodes 21 and 22 are applied to the input grids of a conventional difference amplifier V–3 which produces an output potential at its plate varying in magnitude and phase in accordance with the amplitude and sense of the error signal present on conductor 12. The output from amplifier V–3 is applied via capacitor C–4 to amplifier A, which is identical to its counterpart of Fig. 1. The output of amplifier A is applied via coupling capacitor C–2 and conductor 13 through selective gating means indicated generally at 30 to storage capacitor C–1 and isolating device V–1, which latter parts function as described above in connection with Fig. 1. The selective gating means 30 comprises a pair of photo-resistors R–7 and R–8, which are actuated by light sources 24 and 25, which may comprise, for example, small neon bulbs. Light sources 24 and 25 are flashed in synchronism with the application of magnetic flux to semi-conductor 20, both the neon bulbs and coil 23 being excited from the same transformer 26. Thus it may be seen that photo-resistors R–7 and R–8 will alternately vary in resistance in opposite senses, connecting conductor 13 to conductor 14 through the low resistance of photo-resistor R–7 during $t_1$ half-cycles and connecting conductor 13 to conductor 15 through the low resistance of photo-resistor R–8 during $t_2$ half-cycles. As in Fig. 1, storage capacitor C–1 will be charged or discharged to the potential level required to produce an output potential at terminal 11 of the magnitude and polarity sufficient to cancel the error signal at conductor 12. Transformer 26 may be excited by either power line frequency or by a higher (or lower) frequency source. Due to the rapid action of the neon tubes, the photo-resistors and the semi-conductor, much higher gating frequencies than those allowable in mechanical vibrators may be utilized, improving the frequency response of the invention as mentioned above.

Referring to Fig. 4 there is shown an alternative embodiment of the invention used as a voltage amplifier. The input voltage is applied at terminal 10 to contact 1 of chopper VB–1. The apparatus is in many respects identical to that of Fig. 1. The input is amplified in amplifier A and applied during time $t_1$ via contact 4 of the switching means to storage capacitor C–1 and the grid of cathode follower V–1. Amplifier A may be similar to its counterpart of Fig. 1 except that zero degrees phase shift (no polarity reversal) is provided. During time $t_2$, the voltage across resistor R–1, which is a fixed fraction of the output voltage, is applied via contact 2 of the switching means to the input of amplifier A. Hence the input circuit of amplifier A is translated between the applied voltage input and a potential proportional to the output voltage, and as will be seen, the output voltage of amplifier A is pumped to capacitor C–1 to produce a voltage level on capacitor C–1 such that cathode follower V–1 produces the desired output voltage to make equal the potentials on terminals 1 and 2 of VB–1. The amplification of the embodiment of Fig. 4 is determined by the ratio of resistances of resistors $R_1$ and $R_2$, or expressed mathematically:

$$\text{Gain}=\frac{R_1+R_2}{R_1}$$

During $t_2$ half-cycles coupling capacitor C–2 is prepared with the potential at terminal E by means of contact 5 of the chopper.

Assume that the circuit constants of cathode follower V–1 are selected so that with zero input potential on grid 20, the cathode of tube V–1 and output terminal 11 remain at ground or reference potential. Also assume that the desired circuit gain is 10, so that resistance R–2 has a resistance nine times as great as that of resistor R–1 in accordance with the above expression, and assume that amplifier A has a gain of nine. As a positive input voltage of one volt is applied to terminal 10 and the input of amplifier A during the first $t_1$ half cycle, nine volts will be applied from amplifier A via a capacitor divider comprising capacitors C–2 and C–1 to the grid of V–1. Assuming that C–2 is nine times as large as C–1, it will be seen that 8.1 volts will be applied to the grid of cathode follower V–1, and if the gain of the cathode follower is substantially unity, the output voltage at terminal 11 will rise to 8.1 volts. During time $t_2$, the output voltage will remain at 8.1 volts since grid 20 is connected solely to storage capacitor C–1. The voltage across resistor R–1 (equal to one-tenth of the output voltage, or .81 volts) will be applied via contact 2 of the chopper to amplifier A, and the terminal C side of capacitor C–2 will be discharged through the low output impedance of cathode follower V–1 to a potential of approximately 8.1 volts. As arm 3 translates from contact 2 (carrying a .81 volt potential) to contact 1 (carrying the 1 volt input potential), the .19 potential difference will be amplified in amplifier A, providing a 1.71 volt output potential from amplifier A, raising the potential on capacitor C–1 from 8.1 volts to 9.64 volts, thusly raising the output voltage. It will be seen that as successive cycles occur, the output voltage will be raised until the potential across R–1 equals the input potential, at which time the circuit gain will be equal to $$\frac{R_2+R_1}{R_1}$$

as mentioned above.

It will be seen that during $t_1$ half-cycles that no feedback is applied to the input of amplifier A, so that if amplifier A were provided with very high gain, that an output potential well above the desired potential would be produced. Hence it becomes necessary in the apparatus of Fig. 4 to limit the gain of amplifier A, so that an output exceeding that desired is not obtained. This may be done by making the product of the gain of amplifier A, the gain of cathode follower V–1 and the capacitor divider ratio $$\frac{C_2}{C_2+C_1}$$

less than the overall circuit gain $$\frac{R_2+R_1}{R_1}$$

Since the potential at terminal F will equal the input potential at balance, it will be seen that the invention will offer infinite input impedance at balance, and since the potential at the cathode of V–1 is independent of load current drawn from terminal 11, the output impedance is zero at balance. The abovedescribed limitation of gain in amplifier A may result in lower frequency response than otherwise would be obtainable, but the fact that circuit gain is rigidly fixed by the ratio of resistors R–1 and R–2 and the desirable high input and low output impedances of the circuit make the apparatus of Fig. 4 advantageous for many applications where extremely fast frequency responses are not required. Fast response may be obtained by making $$\frac{C_2}{C_2+C_1}\times \text{Gain}_A \times \text{Gain}_{V-1}$$

only slightly less than $$\frac{R_2+R_1}{R_1}$$

Even where $$\frac{C_2}{C_2+C_1}\times \text{Gain}_A \times \text{Gain}_{V-1}$$

is only 30% of $$\frac{R_2+R_1}{R_1}$$

the output voltage at 11 will have attained over 90% of the voltage change in six cycles of the chopper, which is still quite rapid enough for almost all practical applications. The non-linearity of cathode follower V–1 may be corrected by means of non-linear resistors in the same manner as utilized in Fig. 1. The rapid gating circuit of Fig. 3 may be substituted in Fig. 4 for the chopper to improve the frequency response of the invention.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a direct current operational amplifier, an input circuit including an input terminal and a reference terminal, first cyclic switching means operable to switch between said input terminal and said reference terminal to provide a periodic error signal, means connecting said error signal to the input terminal of an amplifier means, a first capacitor having one terminal connected to an output terminal of said amplifier means to transmit the error signal after amplification, second cyclic switching means in synchronization with said first cyclic switching means, said second cyclic switching means connecting to the second terminal of said first capacitor, a first and second contact for said second cyclic means, means connecting said first contact to one terminal of a second capacitor and to the input terminal of an isolating means, means grounding the other terminal of said second capacitor, means connecting said second contact to the output terminal of said isolating means, said second cyclic means closing with said first contact at the same time said first cyclic means closes with the input terminal of said input circuit, and circuit means applying a portion of the potential from the output terminal of said isolating means degeneratively to the input terminal of said input circuit.

2. In a direct current operational amplifier, an input circuit including an input terminal and a reference terminal, first cyclic switching means operable to switch between said input terminal and said reference terminal to provide a periodic error signal, means connecting said error signal to the input terminal of an amplifier means, a first capacitor having one terminal connected to an output terminal of said amplifier means to transmit the error signal after amplification, second cyclic switching means in synchronization with said first cyclic switching means, said second cyclic switching means connecting to the second terminal of said first capacitor, a first and second contact for said second cyclic means, means connecting said first contact to one terminal of a second capacitor and to the input terminal of an isolating means, means grounding the other terminal of said second capacitor, means connecting said second contact to the output terminal of said isolating means through a resistance network to provide a voltage at said second contact substantially equal to the voltage on said one terminal of the second capacitor, said second cyclic means closing with said first contact at the same time said first cyclic means closes with the input terminal of said input circuit, and circuit means applying a portion of the potential from the output terminal of said isolating means degeneratively to the input terminal of said input circuit.

3. In a direct current operational amplifier, an input circuit including an input terminal and a reference terminal, first cyclic switching means operable to switch between said input terminal and said reference terminal to provide a periodic error signal, means connecting said error signal to the input terminal of an amplifier means, a first capacitor having one terminal connected to an output terminal of said amplifier means to transmit the error signal after amplification, second cyclic switching means in synchronization with said first cyclic switching means, said second cyclic switching means connecting to the second terminal of said first capacitor, a first and second contact for said second cyclic means, means connecting said first contact to one terminal of a second capacitor and to the input terminal of a cathode follower, means grounding the other terminal of said second capacitor, means connecting said second contact to the output terminal of said cathode follower through a resistance network to provide a voltage at said second contact substantially equal to the voltage on said one terminal of the second capacitor, said second cyclic means closing with said first contact at the same time said first cyclic means closes with the input terminal of said input circuit, and circuit means applying a portion of the potential from the output terminal of said isolating means degeneratively to the input terminal of said input circuit.

4. In a direct current operational amplifier, an input circuit including an input terminal and a reference terminal, first cyclic switching means operable to switch between said input terminal and said reference terminal to provide a periodic error signal, means connecting said error signal to the input terminal of an amplifier means, a first capacitor having one terminal connected to an output terminal of said amplifier means to transmit the error signal after amplification, second cyclic switching means in synchronization with said first cyclic switching means, said second cyclic switching means connecting to the second terminal of said first capacitor, a first and second contact for said second cyclic means, means connecting said first contact to one terminal of a second capacitor and to the input terminal of an isolating means, means grounding the other terminal of said second capacitor, means connecting said second contact to the output terminal of said isolating means through a resistance network to provide a voltage at said second contact substantially equal to the voltage on said one terminal of the second capacitor, said second cyclic means closing with said first contact at the same time said first cyclic means closes with the input terminal of said input circuit, said second cyclic means closing with said second contact at the same time said first cyclic means closes with said reference terminal, and circuit means applying a portion of the potential from the output terminal of said isolating means degeneratively to the input terminal of said input circuit.

5. In a direct current operational amplifier, an input circuit including an input terminal and a reference terminal, first cyclic switching means operable to switch between said input terminal and said reference terminal to provide a periodic error signal, means connecting said error signal to the input terminal of an amplifier means, a first capacitor having one terminal connected to an output terminal of said amplifier means to transmit the error signal after amplification, second cyclic switching means in synchronization with said first cyclic switching means, said second cyclic switching means connecting to the second terminal of said first capacitor, a first and second contact for said second cyclic means, means connecting said first contact to one terminal of a second capacitor and to the input terminal of a cathode follower, means grounding the other terminal of said second capacitor, means connecting said second contact to the output terminal of said cathode follower through a resistance network to provide a voltage at said second contact substantially equal to the voltage on said one terminal of the second capacitor, said second cyclic means closing with said first contact at the same time said first cyclic means closes with the input terminal of said input circuit, said second cyclic means closing with said second contact at the same time said first cyclic means closes with said reference terminal, and circuit means applying a portion of the potential from the output terminal of said isolating means degeneratively to the input terminal of said input circuit.

6. An amplifier comprising an input terminal and an output terminal, first switching means for providing an error signal by connecting said input terminal alternately to a signal terminal providing a signal to be amplified and to a reference terminal providing a reference potential, second switching means connecting said output terminal through a first storage device alternately to first and second intermediate terminals, means connecting said first intermediate terminal to an input terminal of an isolating circuit and to one terminal of a second storage device, means connecting a second terminal of said second storage device to said reference terminal, a resistor network connected between an output terminal of said isolating means and said reference terminal, means connecting said second intermediate terminal to a selected terminal of said resistor network, means feeding a portion of the potential on the output terminal of said isolating device to said signal terminal, and means synchronizing said switching means to provide a potential from the signal terminal to the input terminal of said amplifier simultaneously with the provision of a potential from the output of said amplifier through said first storage device to said second storage device.

7. An amplifier comprising an input terminal and an output terminal, first switching means for providing an error signal by connecting said input terminal alternately to a signal terminal providing a signal to be amplified and to a reference terminal providing a reference potential, second switching means connecting said output terminal through a first capacitor alternately to first and second intermediate terminals, means connecting said first intermediate terminal to an input terminal of an isolating circuit and to one terminal of a second capacitor, means connecting a second terminal of said second capacitor to said reference terminal, a resistor network connected between an output terminal of said isolating means and said reference terminal, means connecting said second intermediate terminal to a selected terminal of said resistor network, means feeding a portion of the potential on the output terminal of said isolating device to said signal terminal, and means synchronizing said first and second switching means to provide a potential from the signal terminal to the input terminal of said amplifier simultaneously with the provision of a potential from the output of said amplifier through said first capacitor to said second capacitor.

8. An amplifier comprising an input terminal and an output terminal, switching means connecting said input terminal alternately to a signal terminal providing a signal to be amplified and to a reference terminal providing a reference potential, switching means connecting said output terminal through a first storage device alternately to first and second intermediate terminals, means connecting said first intermediate terminal to an input terminal of an isolating circuit and to one terminal of a second storage device, means connecting a second terminal of said second storage device to said reference potential, a resistor network connected between an output terminal of said isolating means and said reference potential, means connecting said second intermediate terminal to a selected terminal of said resistor network, said selected terminal providing a potential substantially equal to the potential on the one terminal of said second storage device, means feeding a portion of the potential on the output terminal of said isolating device to said signal terminal, and means synchronizing said switching means to provide a potential from the signal terminal to the input terminal of said amplifier simultaneously with the provision of a potential from the output of said amplifier through said first storage device to said second storage device.

9. An amplifier comprising an input terminal and an output terminal, switching means connecting said input terminal alternately to a signal terminal providing a signal to be amplified and to a reference terminal providing a reference potential, switching means connecting said output terminal through a first storage device alternately to first and second intermediate terminals, means connecting said first intermediate terminal to an input terminal of an isolating circuit and to one terminal of a second storage device, means connecting a second terminal of said second storage device to said reference potential, a resistor network connected between an output terminal of said isolating means and said reference potential, means connecting said second intermediate terminal to a selected terminal of said resistor network, said selected terminal providing a potential substantially equal to the potential on the one terminal of said second storage device, means feeding a portion of the potential on the output terminal of said isolating device to said first terminal, and means synchronizing said switching means to provide a potential from the signal terminal to the input terminal of said amplifier simultaneously with the provision of a potential from the output of said amplifier through said first storage device to said second storage device, and means synchronizing said switching means to provide a reference potential from the reference terminal to the input terminal of said amplifier simultaneously with the provision of a potential from said selected terminal to said first storage device.

10. In an amplifier having an input terminal and an output terminal, stabilizing means comprising synchronous switching means, said switching means alternately connecting a first terminal carrying a signal voltage and a second terminal carrying a reference potential to the input terminal of said amplifier, coupling means connected between said output terminal and a second portion of said synchronous switching means, said coupling means connecting alternately through a second pair of contacts in said second portion of said switching means to first and second intermediate terminals concurrently with the closure of said first and second terminals, storage means connected between said first intermediate terminal and a terminal connected to said reference potential to assume the output potential appearing across said first coupling means, means applying the potential on said storage means to the input terminal of an isolating circuit, means connecting said second intermediate terminal through a reference terminal in a resistance network to the output terminal of said isolating means, and means coupling the output terminal of said isolating means to said first signal carrying terminal, whereby the alternate closure of said first and second terminals induces an error signal which is amplified by said amplifier and passed to said storage circuits and to said reference terminal to vary the feedback voltage and null the error.

11. Direct current amplifying apparatus comprising an amplifier having an input terminal and an output terminal, stabilizing means including cyclic switching means, said switching means alternately connecting a first terminal carrying an input signal voltage and a second terminal carrying a reference potential to the input terminal of said amplifier, a coupling capacitor connected between said output terminal and said synchronous switching means, means connecting said coupling capacitor alternately to first intermediate and second intermediate terminals concurrently with the closure of said first and second terminals, storage means connected between said first intermediate terminal and ground to assume the output potential appearing on a terminal of said coupling capacitor, means applying the potential on said storage means to the input terminal of an isolating circuit, means connecting said second intermediate terminal through a reference terminal in a resistance network to the output terminal of said isolating means, and means coupling the output terminal of said isolating means to said first terminal carrying an input voltage, whereby the alternate closure of said first and second terminals induces an error signal which is amplified by said amplifier and passed to said storage circuits and to said reference terminal to vary the feedback voltage and null the error.

References Cited in the file of this patent

UNITED STATES PATENTS

| | | |
|---|---|---|
| 2,709,205 | Colls | May 24, 1955 |
| 2,757,283 | Ingerson et al. | July 31, 1956 |

FOREIGN PATENTS

| | | |
|---|---|---|
| 622,491 | Great Britain | May 3, 1949 |